United States Patent
Tan (10) Patent No.: US 10,331,275 B2
(45) Date of Patent: Jun. 25, 2019

(54) PROCESS IMAGE ACCORDING TO MAT CHARACTERISTIC

(71) Applicant: Hewlett-Packard Development Company, L.P., Houston, TX (US)

(72) Inventor: Kar-Han Tan, Sunnyvale, CA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 101 days.

(21) Appl. No.: 15/500,828

(22) PCT Filed: Jul. 31, 2014

(86) PCT No.: PCT/US2014/049285
§ 371 (c)(1),
(2) Date: Jan. 31, 2017

(87) PCT Pub. No.: WO2016/018409
PCT Pub. Date: Feb. 4, 2016

(65) Prior Publication Data
US 2017/0220203 A1  Aug. 3, 2017

Related U.S. Application Data

(63) Continuation of application No. PCT/US2014/049285, filed on Jul. 31, 2014.

(51) Int. Cl.
*G06F 3/042* (2006.01)
*G06F 3/0487* (2013.01)
(Continued)

(52) U.S. Cl.
CPC .......... *G06F 3/0425* (2013.01); *G06F 1/1632* (2013.01); *G06F 3/017* (2013.01); *G06F 3/038* (2013.01); *G06F 3/03545* (2013.01); *G06F 3/0487* (2013.01); *G06F 3/04883* (2013.01); *H04N 9/3182* (2013.01); *H04N 9/3194* (2013.01); *G06F 1/16* (2013.01); *G06F 2200/1631* (2013.01); *G06F 2203/0384* (2013.01)

(58) Field of Classification Search
CPC .. G06F 3/0425; G06F 1/1632; G06F 3/04883; G06F 3/03545; G06F 3/0487; G06F 3/00; G06F 1/16; G06F 2200/1631; G06F 2203/0384; H04N 9/3194; H04N 9/3182
USPC .................... 348/223.1–229.1, 362
See application file for complete search history.

(56) References Cited

U.S. PATENT DOCUMENTS 7,599,561 B2   10/2009   Wilson et al.
7,710,391 B2   5/2010   Bell et al.
(Continued)

OTHER PUBLICATIONS

Imaging Touch Screen and Display, Copyright © 2003-2014—UK Essays, 1-4 /ukessays.com/essays/.
(Continued)

*Primary Examiner* — Yogesh K Aggarwal
(74) *Attorney, Agent, or Firm* — HP Inc. Patent Department (57) ABSTRACT

Examples disclosed herein relate to a mat characteristic to process images. Examples include to acquire an image of a mat from a camera in a computing device; to process the image according to the mat characteristic in the computing device; and to display the processed image.

15 Claims, 10 Drawing Sheets

(51) Int. Cl.
 *G06F 3/01* (2006.01)
 *G06F 3/038* (2013.01)
 *H04N 9/31* (2006.01)
 *G06F 3/0488* (2013.01)
 *G06F 3/0354* (2013.01)
 *G06F 1/16* (2006.01)

(56) References Cited

U.S. PATENT DOCUMENTS

| | | |
|---|---|---|
| 8,121,640 B2 | 2/2012 | Russ et al. |
| 8,199,117 B2 | 6/2012 | Izadi et al. |
| 8,559,074 B2 | 10/2013 | Keniston et al. |
| 8,736,583 B2 | 5/2014 | Anderson et al. |
| 2005/0078092 A1 | 4/2005 | Clapper |
| 2008/0018591 A1 | 1/2008 | Pittel et al. |
| 2008/0042999 A1 | 2/2008 | Martin |
| 2009/0017555 A1 | 1/2009 | Jehanli et al. |
| 2010/0103330 A1* | 4/2010 | Morrison ............ G06F 3/0412 348/744 |
| 2010/0149420 A1 | 6/2010 | Zhang et al. |
| 2011/0242054 A1 | 10/2011 | Tsu |
| 2011/0285745 A1 | 11/2011 | Zhang et al. |
| 2013/0077236 A1 | 3/2013 | Becze et al. |
| 2013/0093915 A1 | 4/2013 | Zhang et al. |
| 2013/0113920 A1 | 5/2013 | Blanton et al. |
| 2014/0030679 A1 | 1/2014 | Wong |
| 2014/0160535 A1 | 6/2014 | Shen et al. |
| 2014/0176735 A1* | 6/2014 | Short ................ H04N 1/00267 348/207.1 |

OTHER PUBLICATIONS

Shahram Izadi et al., "C-Slate: A Multi-Touch and Object Recognition System for Remote Collaboration using Horizontal Surfaces,", 2007, pp. 3-10, IEEE.

\* cited by examiner

PROCESS IMAGE ACCORDING TO MAT CHARACTERISTIC

BACKGROUND

Various distortions may appear in images captured by a camera. Methods of altering an image to reduce these distortions and adjust other image properties have been developed for physical camera images. Methods of adjusting image properties in a digitally captured image have been developed. In some examples, a user may alter the captured image while the image is displayed to preview the impact of the adjustment. In other examples, an image may be processed to adjust image properties before it is displayed.

BRIEF DESCRIPTION OF THE DRAWINGS

The following detailed description references the drawings, wherein.

DETAILED DESCRIPTION

Certain terms are used throughout the following description and claims to refer to particular system components. As one skilled in the art will appreciate, computer companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ." Also, the term "couple" or "couples" is intended to mean either an indirect or direct connection. Thus, if a first device couples to a second device, that connection may be through a direct electrical or mechanical connection, through an indirect electrical or mechanical connection via other devices and connections, through an optical electrical connection, or through a wireless electrical connection. As used herein the term "approximately" means plus or minus 10%. As used herein, "image processing," "to process" an image, or "processing" an image refers to any device, system, or method to adjust features or properties of a captured image. In addition, as used herein, the phrase "user input device" refers to any suitable device for providing an input, by a user, into an electrical system such as, for example, a mouse, keyboard, a hand (or any finger thereof), a stylus, a pointing device, etc.

Images captured by a camera may be processed to more accurately reflect the captured scene. In some examples, the brightness and contrast of a captured image may be adjusted to more accurately capture real world conditions. In other examples, a user may seek to alter brightness and contrast of an image for artistic effect. In digital camera systems, the camera may automatically adjust certain features of an image or provide standard adjustment options to a user. However, these adjustments may not correct all distortions in the captured image.

To address these issues, in the examples described herein, a computing system may adjust captured images from a fixed camera according to a characteristic of a computing system component in the field of view of the camera. In some example, the computing device may process the captured image according to a mat characteristic of a mat in the field of view of a camera. For example, the computing device may adjust color balance of the captured image according to a known color and reflectance of the mat. In an example, various sensors in the computing system may provide additional information about environmental factors that may be used for image processing. In an example, the mat may be a touch-sensitive mat to detect the location of an object on the mat and the computing device may adjust image illumination according to the known location of the object and an ambient light sensor value. In yet another example, geometric correction may be applied to a projection of a captured image onto the mat according to the known location of the mat. In this manner, examples described herein may increase the robustness of image processing of a captured image in a computing system.

The following discussion is directed to various examples of the disclosure. Although one or more of these examples may be preferred, the examples disclosed should not be interpreted, or otherwise used, as limiting the scope of the disclosure, including the claims. In addition, one skilled in the art will understand that the following description has broad application, and the discussion of any example is meant only to be descriptive of that example, and not intended to intimate that the scope of the disclosure, including the claims, is limited to that example.

Referring now to FIGS. 1-4, a computer system 100 in accordance with the principles disclosed herein is shown. In this example, system 100 generally comprises a support structure 110, a computing device 150, a projector unit 180, and a mat 200. Computing device 150 may comprise any suitable computing device while still complying with the principles disclosed herein. For example, in some implementations, device 150 may comprise an electronic display, a smartphone, a tablet, an all-in-one computer (i.e., a display that also houses the computer's board), or some combination thereof. In this example, device 150 is an all-in-one computer that includes a central axis or center line 155, first or top side 150a, a second or bottom side 150b axially opposite the top side 150a, a front side 150c extending axially between the sides 150a, 150b, a rear side also extending axially between the sides 150a, 150b and generally radially opposite the front side 150c. A display 152 defines a viewing surface and is disposed along the front side 150c to project images for viewing and interaction by a user (not shown). In some examples, display 152 includes touch sensitive technology such as, for example, resistive, capacitive, acoustic wave, infrared (IR), strain gauge, optical, acoustic pulse recognition, or some combination thereof. Therefore, throughout the following description, display 152 may periodically be referred to as a touch sensitive surface or display. In addition, in some examples, device 150 further includes a camera 154 that is to take images of a user while he or she is positioned in front of display 152. In some implementations, camera 154 is a web camera. Further, in some examples, device 150 also includes a microphone or similar device that is arranged to receive sound inputs (e.g., voice) from a user during operation.

Referring still to FIGS. 1-4, support structure 110 includes a base 120, an upright member 140, and a top 160. Base 120 includes a first or front end 120a, and a second or rear end 120b. During operation, base 120 engages with a support surface 15 to support the weight of at least a portion of the components (e.g., member 140, unit 180, device 150, top 160, etc.) of system 100 during operation. In this example, front end 120a of base 120 includes a raised portion 122 that is slightly separated above the support surface 15 thereby creating a space or clearance between portion 122 and surface 15. As will be explained in more detail below, during operation of system 100, one side of mat 200 is received within the space formed between portion 122 and surface 15 to ensure proper alignment of mat 200. However, it should be appreciated that in other examples, other suitable alignments methods or devices may be used while still complying with the principles disclosed herein.

Upright member 140 includes a first or upper end 140a, a second or lower end 140b opposite the upper end 140a, a first or front side 140c extending between the ends 140a, 140b, and a second or rear side 140d opposite the front side 140c and also extending between the ends 140a, 140b. The lower end 140b of member 140 is coupled to the rear end 120b of base 120, such that member 140 extends substantially upward from the support surface 15.

Top 160 includes a first or proximate end 160a, a second or distal end 160b opposite the proximate end 160a, a top surface 160c extending between the ends 160a, 160b, and a bottom surface 160d opposite the top surface 160c and also extending between the ends 160a, 160b. Proximate end 160a of top 160 is coupled to upper end 140a of upright member 140 such that distal end 160b extends outward therefrom. As a result, in the example shown in FIG. 2, top 160 is supported only at end 160a and thus is referred to herein as a "cantilevered" top. In some examples, base 120, member 140, and top 160 are all monolithically formed; however, it should be appreciated that in other example, base 120, member 140, and/or top 160 may not be monolithically formed while still complying with the principles disclosed herein.

Referring still to FIGS. 1-4, mat 200 includes a central axis or centerline 205, a first or front side 200a, and a second or rear side 200b axially opposite the front side 200a. In this example, a touch sensitive surface 202 is disposed on mat 200 (a "touch sensitive mat") and is substantially aligned with the axis 205. Surface 202 may comprise any suitable touch sensitive technology for detecting and tracking one or multiple touch inputs by a user in order to allow the user to interact with software being executed by device 150 or some other computing device (not shown). For example, in some implementations, surface 202 may utilize known touch sensitive technologies such as, for example, resistive, capacitive, acoustic wave, infrared, strain gauge, optical, acoustic pulse recognition, or some combination thereof while still complying with the principles disclosed herein. In addition, in this example, surface 202 extends over a portion of mat 200 such that a mat border 290 is formed to surround surface 202; however, it should be appreciated that in other examples, surface 202 may extend over substantially all of mat 200 while still complying with the principles disclosed herein.

During operation, mat 200 is aligned with base 120 of structure 110, as previously described to ensure proper alignment thereof. In particular, in this example, rear side 200b of mat 200 is placed between the raised portion 122 of base 120 and support surface 15 such that rear end 200b is aligned with front side 120a of base, thereby ensuring proper overall alignment of mat 200, and particularly surface 202, with other components within system 100. In some examples, mat 200 is aligned with device 150 such that the center line 155 of device 150 is substantially aligned with center line 205 of mat 200; however, other alignments are possible. In addition, as will be described in more detail below, in at least some examples surface 202 of mat 200 and device 150 are electrically coupled to one another such that user inputs received by surface 202 are communicated to device 150. Any suitable wireless or wired electrical coupling or connection may be used between surface 202 and device 150 such as, for example, WI-FI, BLUETOOTH®, ultrasonic, electrical cables, electrical leads, electrical spring-loaded pogo pins with magnetic holding force, or some combination thereof, while still complying with the principles disclosed herein. In this example, exposed electrical contacts disposed on rear side 200b of mat 200 engage with corresponding electrical pogo-pin leads within portion 122 of base 120 to transfer signals between device 150 and surface 202 during operation. In addition, in this example, the electrical contacts are held together by adjacent magnets located in the clearance between portion 122 of base 120 and surface 15, previously described, to magnetically attract and hold (e.g., mechanically) a corresponding ferrous and/or magnetic material disposed along rear side 200b of mat 200.

Figure 3:
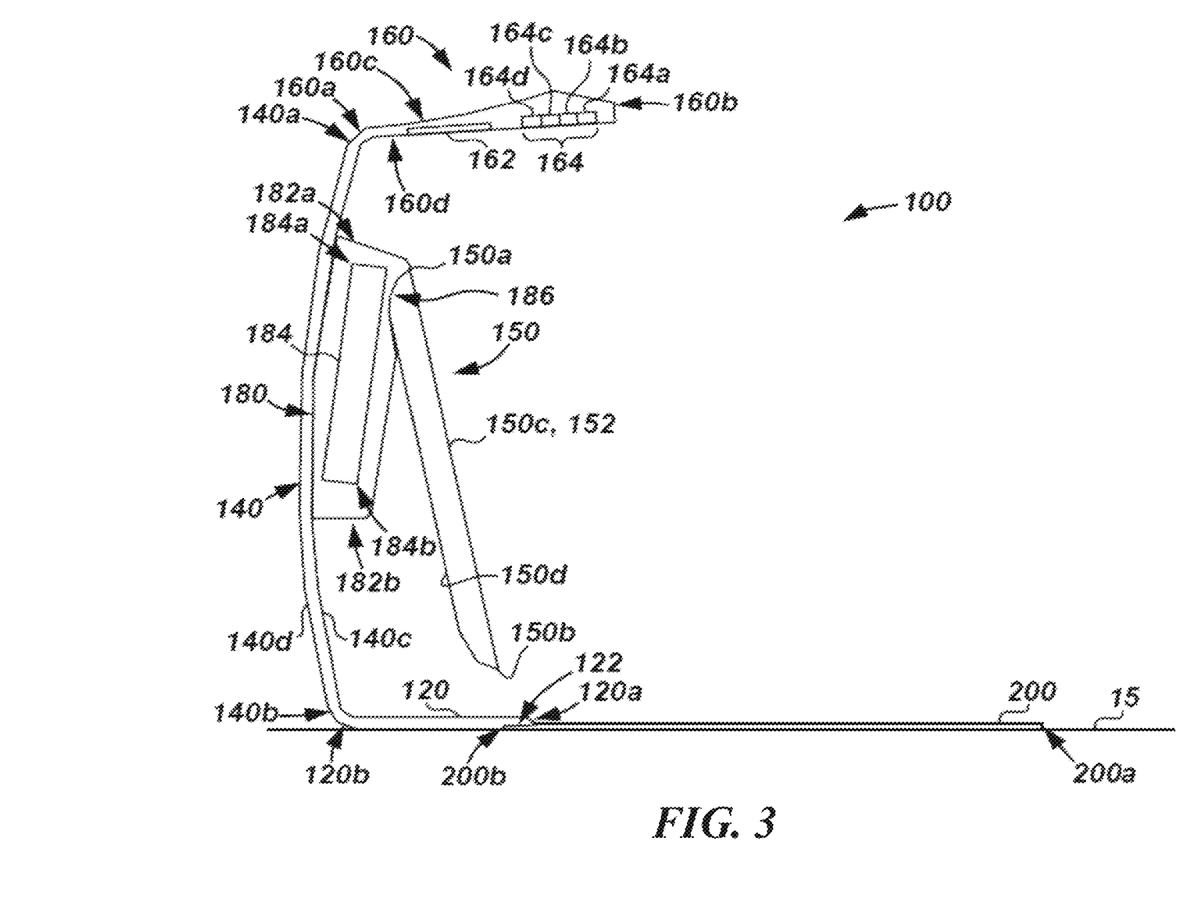
FIG. 3 is a schematic side view of the computer system of FIG. 1 in accordance with the principles disclosed herein.

Referring specifically now to FIG. 3, projector unit 180 comprises an outer housing 182, and a projector assembly 184 disposed within housing 182. Housing 182 includes a first or upper end 182a, a second or lower end 182b opposite the upper end 182a, and an inner cavity 183. In this example, housing 182 further includes a coupling or mounting member 186 to engage with and support device 150 during operations. In general member 186 may be any suitable member or device for suspending and supporting a computer device (e.g., device 150) while still complying with the principles disclosed herein. For example, in some implementations, member 186 comprises hinge that includes an axis of rotation such that a user (not shown) may rotate device 150 about the axis of rotation to attain an optimal viewing angle therewith. Further, in some examples, device 150 is permanently or semi-permanently attached to housing 182 of unit 180. For example, in some implementations, the housing 180 and device 150 are integrally and/or monolithically formed as a single unit.

Figure 4:
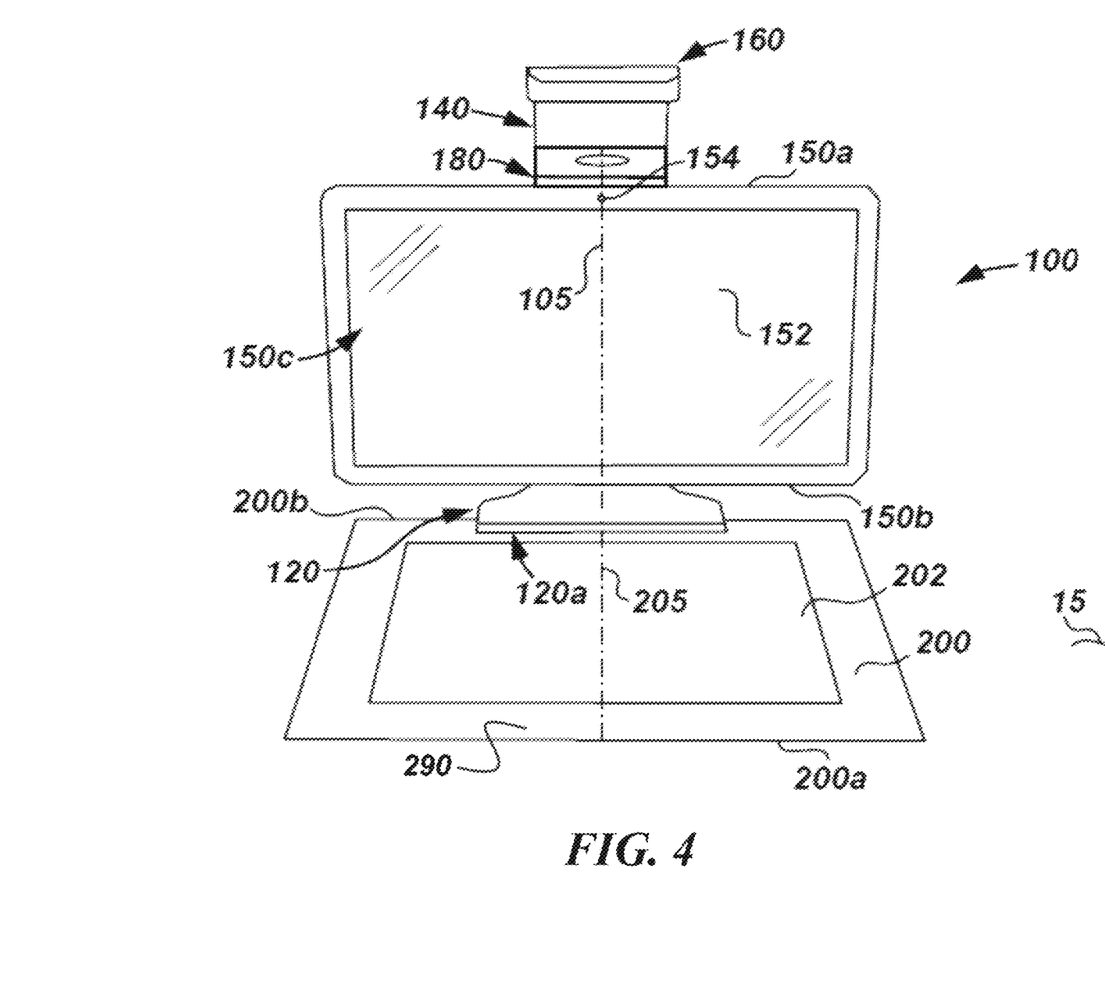
FIG. 4 is a schematic front view of the computer system of FIG. 1 in accordance with the principles disclosed herein.

Thus, referring briefly to FIG. 4, when device 150 is suspended from structure 110 through the mounting member 186 on housing 182, projector unit 180 (i.e., both housing 182 and assembly 184) is substantially hidden behind device 150 when system 100 is viewed from a viewing surface or viewing angle that is substantially facing display 152 disposed on front side 150c of device 150. In addition, as is also shown in FIG. 4, when device 150 is suspended from structure 110 in the manner described, projector unit 180 (i.e., both housing 182 and assembly 184) and any image projected thereby is substantially aligned or centered with respect to the center line 155 of device 150.

Projector assembly 184 is generally disposed within cavity 183 of housing 182, and includes a first or upper end 184a, a second or lower end 184b opposite the upper end 184a. Upper end 184a is proximate upper end 182a of housing 182 while lower end 184b is proximate lower end 182b of housing 182. Projector assembly 184 may comprise any suitable digital light projector assembly for receiving data from a computing device (e.g., device 150) and projecting an image or images (e.g., out of upper end 184a) that correspond with that input data. For example, in some implementations, projector assembly 184 comprises a digital light processing (DLP) projector or a liquid crystal on silicon (LCoS) projector which are advantageously compact and power efficient projection engines capable of multiple display resolutions and sizes, such as, for example, standard XGA (1024×768) resolution 4:3 aspect ratio or standard WXGA (1280×800) resolution 16:10 aspect ratio. Projector assembly 184 is further electrically coupled to device 150 in order to receive data therefrom for producing light and images from end 184a during operation. Projector assembly 184 may be electrically coupled to device 150 through any suitable type of electrical coupling while still complying with the principles disclosed herein. For example, in some implementations, assembly 184 is electrically coupled to device 150 through an electric conductor, WI-FI, BLUETOOTH®, an optical connection, an ultrasonic connection, or some combination thereof. In this example, device 150 is electrically coupled to assembly 184 through electrical leads or conductors (previously described) that are disposed within mounting member 186 such that when device 150 is suspended from structure 110 through member 186, the electrical leads disposed within member 186 contact corresponding leads or conductors disposed on device 150.

Referring still to FIG. 3, top 160 further includes a fold mirror 162 and a sensor bundle 164. Mirror 162 includes a highly reflective surface 162a that is disposed along bottom surface 160d of top 160 and is positioned to reflect images and/or light projected from upper end 184a of projector assembly 184 toward mat 200 during operation. Mirror 162 may comprise any suitable type of mirror or reflective surface while still complying with the principles disclosed herein. In this example, fold mirror 162 comprises a standard front surface vacuum metalized aluminum coated glass mirror that acts to fold light emitted from assembly 184 down to mat 200. In other examples, mirror 162 could have a complex aspherical curvature to act as a reflective lens element to provide additional focusing power or optical correction.

Sensor bundle 164 includes a plurality of sensors and/or cameras to measure and/or detect various parameters occurring on or near mat 200 during operation. For example, in the specific implementation depicted in FIG. 3, bundle 164 includes an ambient light sensor 164a, a camera (e.g., a color camera) 164b, a depth sensor or camera 164c, and a three dimensional (3D) user interface sensor 164d. Ambient light sensor 164a is arranged to measure the intensity of light of the environment surrounding system 100, in order to, in some implementations, adjust the camera's and/or sensor's (e.g., sensors 164a, 164b, 164c, 164d) exposure settings, and/or adjust the intensity of the light emitted from other sources throughout system such as, for example, projector assembly 184, display 152, etc. Camera 164b may, in some instances, comprise a color camera which is arranged to take either a still image or a video of an object and/or document disposed on mat 200. Depth sensor 164c generally indicates when a 3D object is on the work surface. In particular, depth sensor 164c may sense or detect the presence, shape, contours, motion, and/or the 3D depth of an object (or specific feature(s) of an object) placed on mat 200 during operation. Thus, in some implementations, sensor 164c may employ any suitable sensor or camera arrangement to sense and detect a 3D object and/or the depth values of each pixel (whether infrared, color, or other) disposed in the sensor's field-of-view (FOV). For example, in some implementations sensor 164c may comprise a single infrared (IR) camera sensor with a uniform flood of IR light, a dual IR camera sensor with a uniform flood of IR light, structured light depth sensor technology, time-of-flight (TOF) depth sensor technology, or some combination thereof. User interface sensor 164d includes any suitable device or devices (e.g., sensor or camera) for tracking a user input device such as, for example, a hand, stylus, pointing device, etc. In some implementations, sensor 164d includes a pair of cameras which are arranged to stereoscopically track the location of a user input device (e.g., a stylus) as it is moved by a user about the mat 200, and particularly about surface 202 of mat 200. In other examples, sensor 164d may also or alternatively include an infrared camera(s) or sensor(s) that is arranged to detect infrared light that is either emitted or reflected by a user input device. It should further be appreciated that bundle 164 may comprise other sensors and/or cameras either in lieu of or in addition to sensors 164a, 164b, 164c, 164d, previously described. In addition, as will explained in more detail below, each of the sensors 164a, 164b, 164c, 164d within bundle 164 is electrically and communicatively coupled to device 150 such that data generated within bundle 164 may be transmitted to device 150 and commands issued by device 150 may be communicated to the sensors 164a, 164b, 164c, 164d during operations. As is explained above for other components of system 100, any suitable electrical and/or communicative coupling may be used to couple sensor bundle 164 to device 150 such as for example, an electric conductor, WI-FI, BLUETOOTH®, an optical connection, an ultrasonic connection, or some combination thereof. In this example, electrical conductors are routed from bundle 164, through top 160, upright member 140, and projector unit 180 and into device 150 through the leads that are disposed within mounting member 186, previously described.

Figure 5:
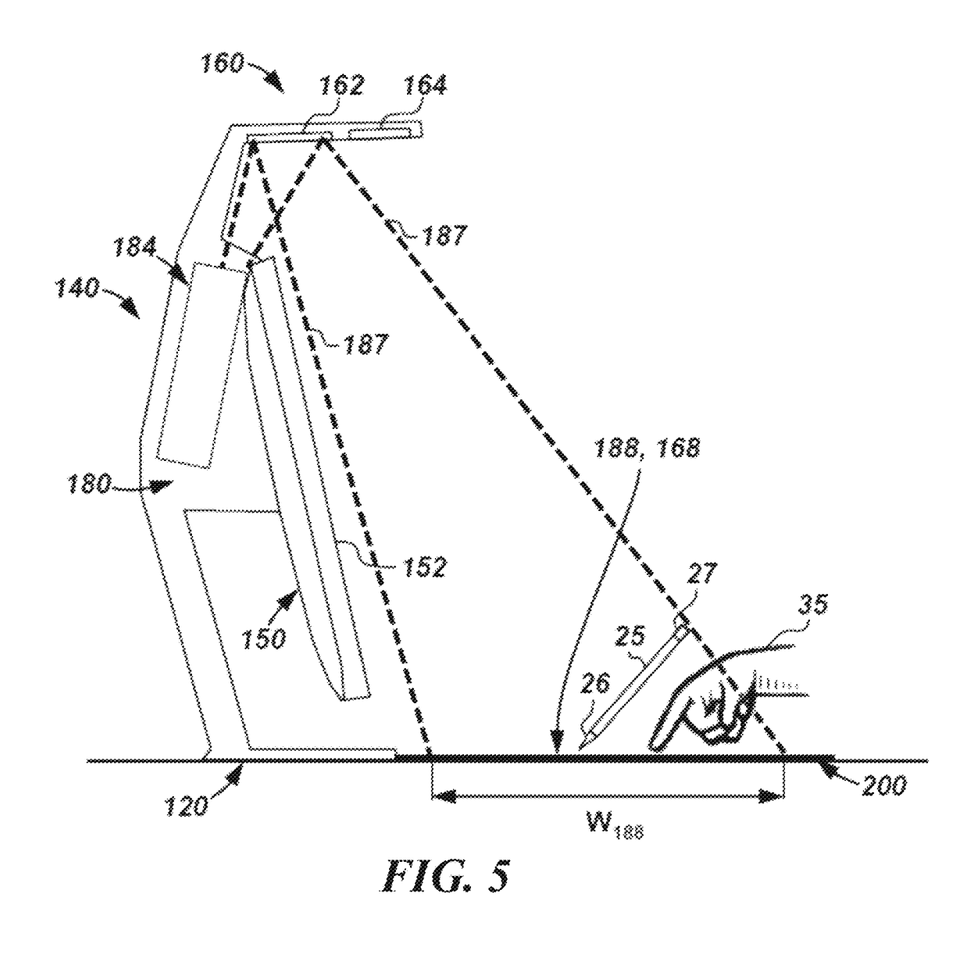
FIG. 5 is a schematic side view of the computer system of FIG. 1 during operation in accordance with the principles disclosed herein.
Figure 6:
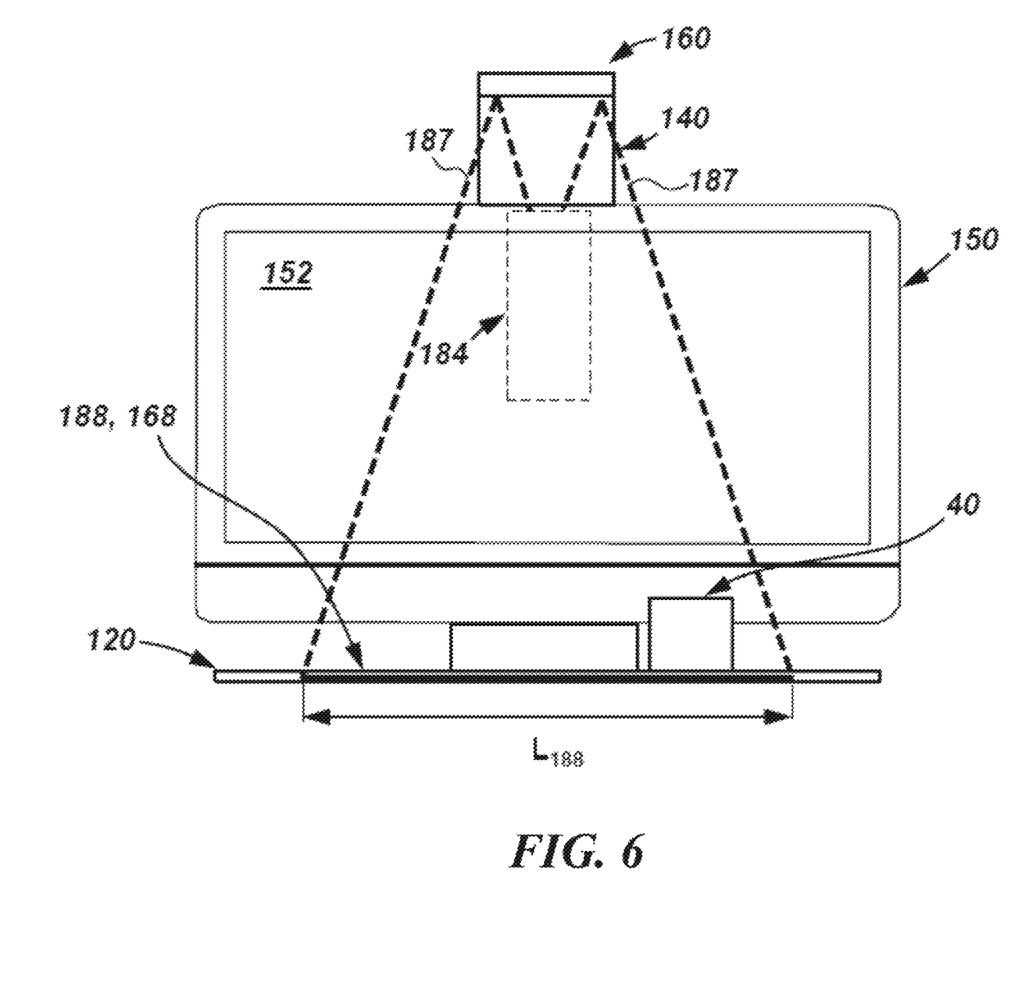
FIG. 6 is a schematic front view of the system of FIG. 1 during operation in accordance with the principles disclosed herein.

Referring now to FIGS. 5 and 6, during operation of system 100, light 187 is emitted from projector assembly 184, and reflected off of mirror 162 towards mat 200 thereby displaying an image on a projector display space 188. In this example, space 188 is substantially rectangular and is defined by a length $L_{188}$ and a width $W_{188}$. In some examples length $L_{188}$ may equal approximately 16 inches, while width $W_{188}$ may equal approximately 12 inches; however, it should be appreciated that other values for both length $L_{188}$ and width $W_{188}$ may be used while still complying with the principles disclosed herein. In addition, the sensors (e.g., sensors 164a, 164b, 164c, 164d) within bundle 164 include a sensed space 168 that, in at least some examples, overlaps and/or corresponds with projector display space 188, previously described. Space 168 defines the area that the sensors within bundle 164 are arranged to monitor and/or detect the conditions thereof in the manner previously described. In some examples, both space 188 and space 168 coincide or correspond with surface 202 of mat 200, previously described, to effectively integrate the functionality of the touch sensitive surface 202, projector assembly 184, and sensor bundle 164 within a defined area.

Figure 7:
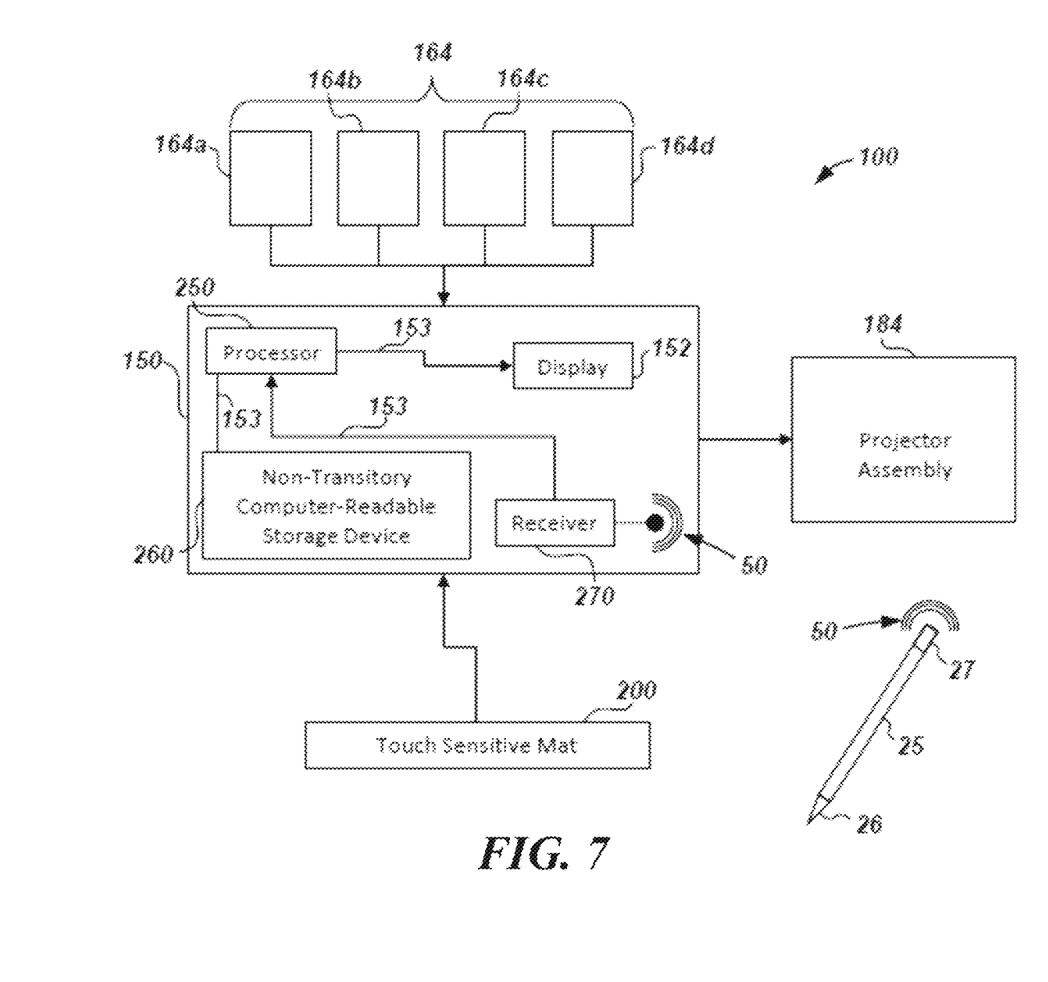
FIG. 7 is a black box circuit diagram of the computer system of FIG. 1 in accordance with the principles disclosed herein.

Referring now to FIGS. 5-7, in some examples, device 150 directs assembly 184 to project an image onto surface 202 of mat 200. In addition, device 150 may also display an image on the display 152 (which may or may not be the same as the image projected onto surface 202 by assembly 184). The image projected by assembly 184 may comprise information and/or images produced by software executing within device 150. A user (not shown) may then interact with the image displayed on surface 202 and display 152 by physically engaging the touch sensitive surface 202 of mat 200. Such interaction may take place through any suitable method such as, direct interaction with a user's hand 35, through a stylus 25, or other suitable user input device(s).

As best shown in FIG. 7, when a user interacts with surface 202 of mat 200, a signal is generated which is routed to device 150 through any of the electrical coupling methods and devices previously described. Once device 150 receives the signal generated within mat 200, it is routed, through internal conductor paths 153, to a processor 250 which communicates with a non-transitory computer-readable storage medium 260 to generate an output signal which is then routed back to projector assembly 184 and/or display 152 to implement a change in the image projected onto surface 202 and/or the image displayed on display 152, respectively. It should also be appreciated that during this process, a user may also be interacting with the image displayed on display 152 through engagement with the touch sensitive surface disposed thereon and/or through another user input device such as, for example, a keyboard and mouse.

In addition, in some examples, stylus 25 further includes a transmitter 27 that is arranged to track the position of stylus 25 (whether or not stylus 25 is interacting with surface 202) and to communicate with a receiver 270 disposed within device 150 through a wireless signal 50. In these examples, input received by receiver 270 from transmitter 27 on stylus 25 is also routed through paths 153 to processor 250 such that an output signal may be generated and routed to the assembly 184 and/or the display 152 as previously described.

Further, in some examples, sensors disposed within bundle 164 (e.g., sensors 164a, 164b, 164c, 164d) may also generate system input which is routed to device 150 for further processing by processor 250 and device 260. For example, in some implementations, sensors within bundle 164 may sense the location and/or presence of a user's hand 35 or stylus 25 and then generate an input signal which is routed to processor 250. Processor 250 then generates a corresponding output signal which is routed to display 152 and/or projector assembly 184 in the manner described above. In particular, in some implementations, bundle 164 includes a pair of cameras or sensors that are arranged to perform stereoscopic stylus tracking (e.g., of stylus 25). In still other implementations, stylus 25 includes a tip 26 that is coated in an infrared retro-reflective coating (e.g., paint), thus allowing it to serve as an infrared retro-reflector. Bundle 164 (and more particularly sensors 164c or 164d) may then further include infrared cameras or sensors as previously described which detect infrared light that is reflected off of tip 26 of stylus 25 and thus track the location of tip 26 as is moves across surface 202 during operation.

As a result, in some examples, the image projected onto surface 202 by assembly 184 serves as a second or alternative touch sensitive display within system 100. In addition, interaction with the image displayed on surface 202 is further enhanced through use of the sensors (e.g., sensors 164a, 164b, 164c, 164d) disposed within bundle 164 as described above.

Referring still to FIGS. 5-7, in addition, during operation of at least some examples, system 100 may capture a two dimensional (2D) image or create a 3D scan of a physical object such that an image of the object may then be projected onto the surface 202 for further use and manipulation thereof. In particular, in some examples, an object 40 may be placed on surface 202 such that sensors (e.g., camera 164b, depth sensor 164c, etc.) within bundle 164 may detect, for instance, the location, dimensions, and in some instances, the color of object 40, to enhance a 2D image or create a 3D scan thereof. The information gathered by the sensors (e.g., sensors 164b, 164c) within bundle 164 may then be routed to processor 250 which communicates with device 260 as previously described. Thereafter, processor 350 directs projector assembly 184 to project an image of the object 40 onto the surface 202. It should also be appreciated that in some examples, other objects such as documents or photos may also be scanned by sensors within bundle 164 in order to generate an image thereof which is projected onto surface 202 with assembly 184. In addition, in some examples, once an object(s) is scanned by sensors within bundle 164, the background of the image may be optionally, digitally removed within the resulting image projected onto surface 202 (or shown on display 152 of device 150). Thus, in some examples, images of physical objects (e.g., object 40) may be captured, digitized, and displayed on surface 202 during operation to quickly and easily create a digital version of a physical object to allow for further manipulation thereof consistent with the manner described herein.

Figure 8:
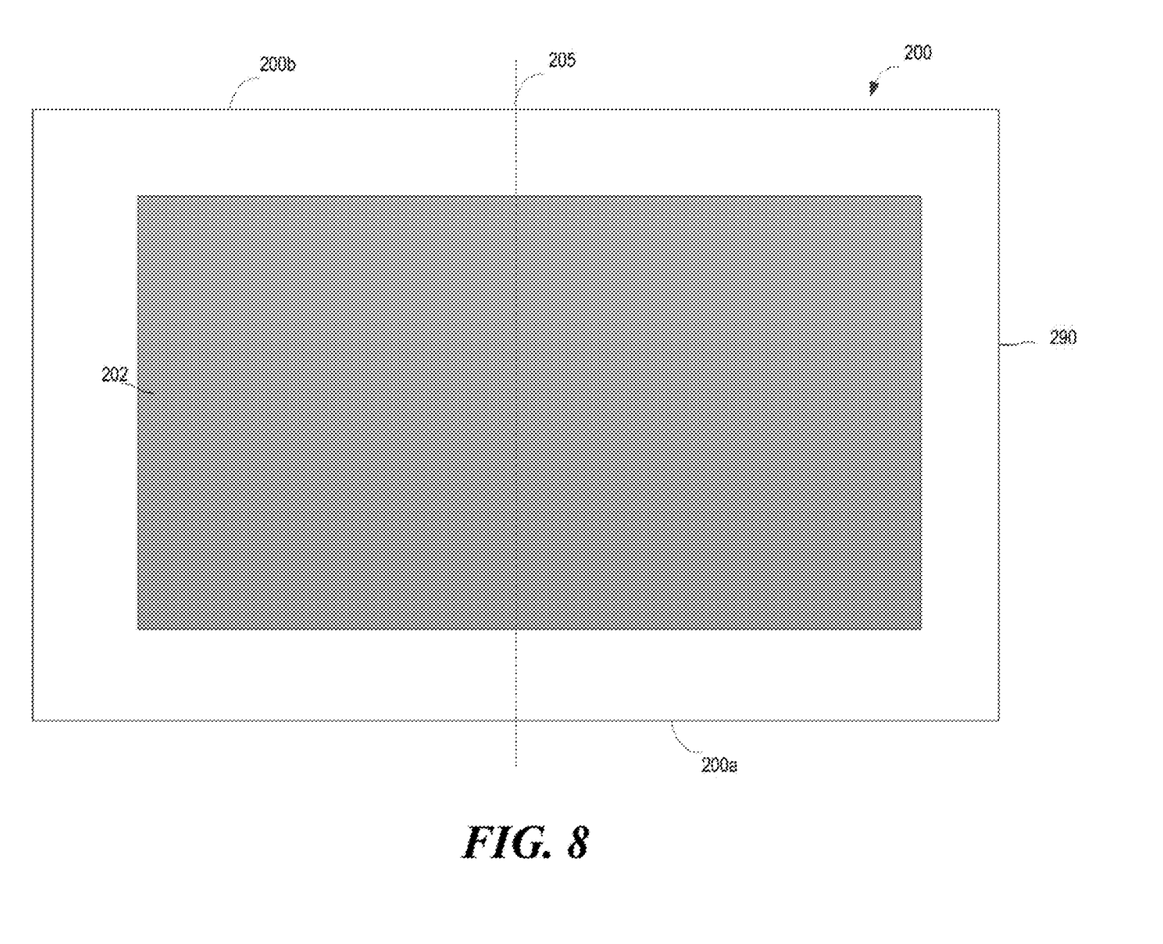
FIG. 8 is a schematic perspective view of a mat of FIG. 1 in accordance with the principles disclosed herein.

Referring now to FIG. 8, a perspective view of mat 200 in accordance with the principles disclosed herein is shown. In the example of FIG. 8, touch sensitive surface 202 may be disposed on a portion of mat 200 and mat border 290 may surround surface 202. In FIG. 8, surface 202 and mat border 290 may be substantially aligned with central axis 205. In some examples, a mat characteristic of mat 200 may be provided to computing device 150 for image processing. For example, the color, reflectance, and location of mat 200 may be provided to computing device 150 for image processing. For example, the computing device 150 may process an image captured by camera 164b to adjust color balance, reduce lens distortion, adjust image illumination, geometric correction, etc. In some examples, a captured image may be segmented and each segment of the image may be separately processed. For example, a captured image may be segmented into pixels and processed to set a first pixel to black (i.e., a black point) or white (i.e., a white point) and other pixels may be processed to adjust color balance accordingly. Referring to FIGS. 1-8, the computing device 150 may display the processed image captured by camera 164b on display 152. In other examples, the processed image may be projected by projector assembly 184 via top 160 onto surface 202, as described herein.

In an example, the color of mat 200 may be set in computing device 150 according to at least one or more of a RGB value, a hex value, and a long value. In some examples, mat 200 may be uniformly colored and may be of a neutral color. In other examples, the color of mat 200 may be non-uniform and of any color. In yet another example, the color of mat border 290 may be the same as or differ from the color of surface 202. Computing device 150 may use the set color of mat 200 and a reflectance of mat 200 to adjust the color balance of a captured image of mat 200 and any other objects captured in the image by camera 164b. In an example, the reflectance of mat 200 may be set in the computing device 150 or determined by the computing device 150 by analyzing a captured image of mat 200 and sensor values from sensor bundle 164.

In an example, the size and location of mat 200 may also be provided to computing device 150 for image processing. In some examples, computing device 150 may determine a location of mat border 290 in the field of camera 164b according to a distance and angle between the camera 164b and mat 200. In an example, computing device 150 may process an image captured by camera 164b to adjust features of the image based on the color of the mat 200 and the location of the mat 200. For example, computing device 150 may process an image captured by camera 164b to reduce lens distortion according to a location of mat border 290. In such an example, computing device 150 may process the captured image to align the location of mat border 290 in the captured image with the known location of mat border 290. In another example, computing device 150 may adjust the captured image to reduce lens distortion (e.g., barrel distortion, pincushion distortion, mustache distortion, etc.) of the mat border 290 and adjust other segments of the captured image accordingly. In yet another example, the size and location of mat 200 may be used for geometric correction of an image projected onto surface 202 by projector assembly 184 via top 160.

In some examples, computing device 150 may process a captured image further according to a sensor value from sensor bundle 164, data from touch sensitive surface 202, or any other sensors in the system 100. For example, a sensor value for ambient light may be used along with the location of the mat 200 and the color of mat 200 to correct image illumination non-uniformity in the captured image. In other examples, a sensor value from an infrared camera sensor, a depth sensor, a three dimensional user interface sensor, and a time of flight depth sensor in sensor bundle 164 may provide additional information to computing device 150 for image processing. In an example, computing device 150 may process a captured image for geometric correction according to a detected location and other characteristics of an object disposed on mat 200. In such an example, the computing device 150 may determine that a portion of mat 200 is covered by the object according to data from touch sensitive surface 202 and may determine other portions of mat 200 are in a shadow formed by the object according to sensor values from sensor bundle 184. In this example, computing device 150 may process the captured image according to the determined location of the object for geometric correction of the projection of the captured image onto surface 202 by projector assembly 184.

Figure 1:
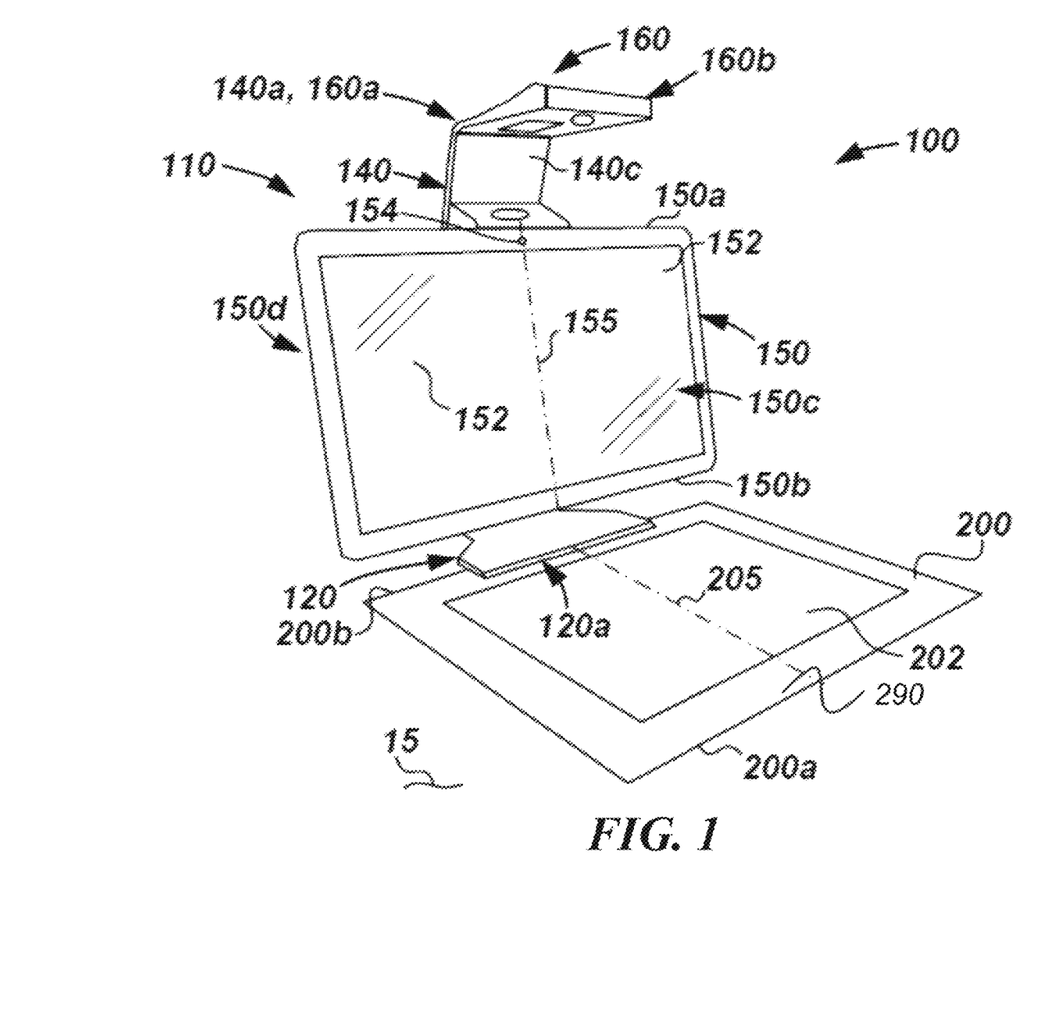
FIG. 1 is a schematic perspective view of an example of a computer system in accordance with the principles disclosed herein.
Figure 2:
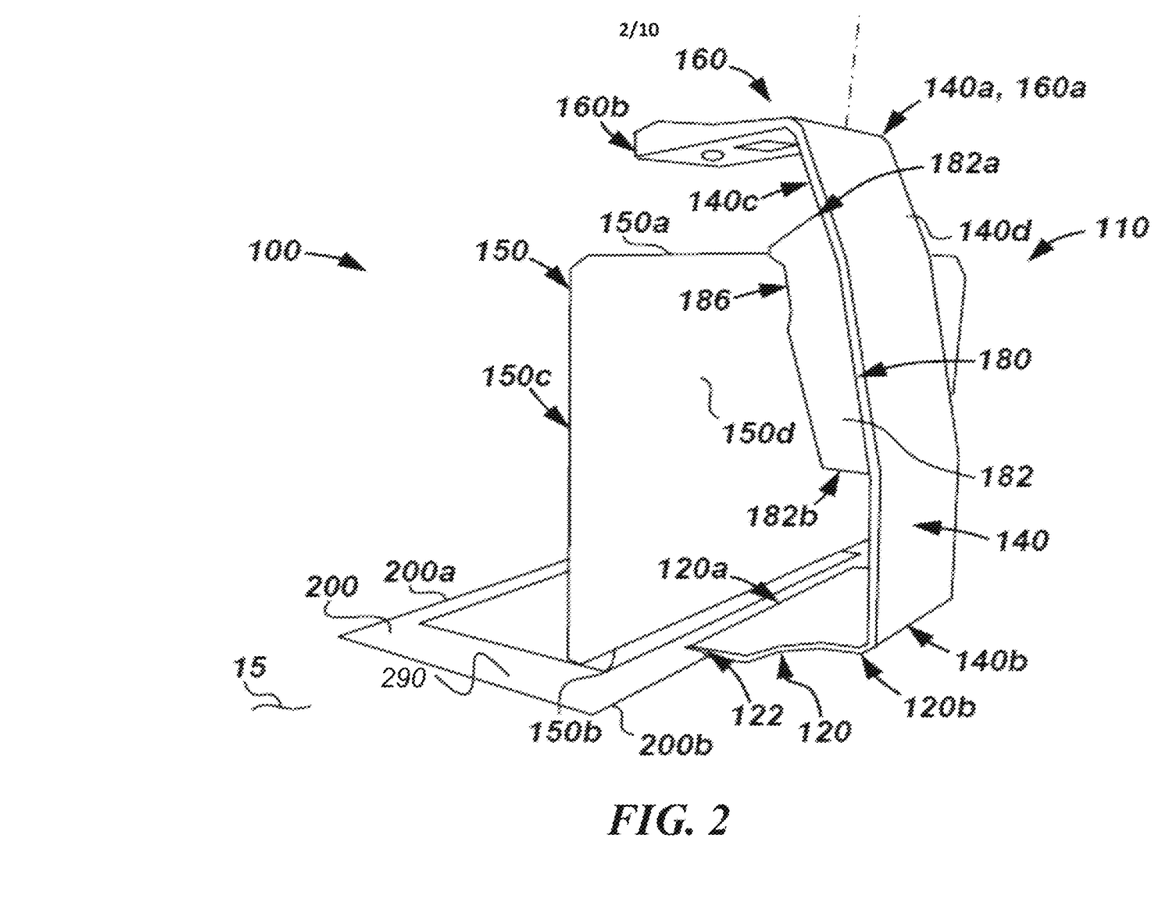
FIG. 2 is another schematic perspective view of the computer system of FIG. 1 in accordance with the principles disclosed herein.
Figure 9:
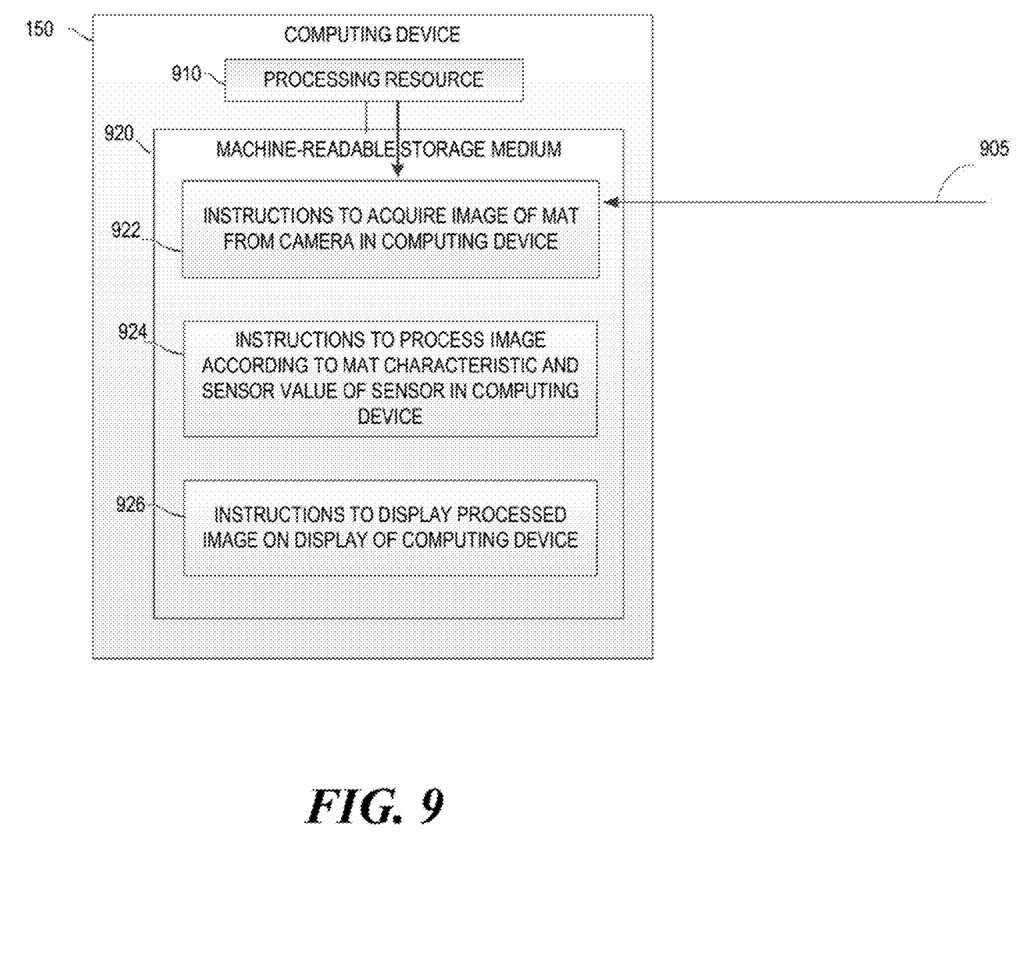
FIG. 9 is a block diagram of an example computing device to process an image captured in the system of FIG. 1 in accordance with the principles disclosed herein.

Referring now to FIG. 9, a block diagram of an example computing device 150 to process an image captured in the system of FIG. 1 in accordance with the principles disclosed herein is shown. In the example of FIG. 9, computing device 150 includes a processing resource 910 and a machine-readable storage medium 920 comprising (e.g., encoded with) instructions 922, 924, and 926 executable by processing resource 910. In some examples, storage medium 920 may include additional instructions. In some examples, instructions 922, 924, and 926, and any other instructions described herein in relation to storage medium 920, may be stored on a machine-readable storage medium remote from but accessible to computing device 150 and processing resource 910 (e.g., via a computer network). In some examples, instructions 922, 924, and 926 may be instructions of a computer program, computer application (app), agent, or the like, of computing device 900. In other examples, the functionalities described herein in relation to instructions 922, 924, and 926 may be implemented as engines comprising any combination of hardware and programming to implement the functionalities of the engines, as described below.

In examples described herein, a processing resource may include, for example, one processor or multiple processors included in a single computing device (as shown in FIG. 9) or distributed across multiple computing devices. A "processor" may be at least one of a central processing unit (CPU), a semiconductor-based microprocessor, a graphics processing unit (GPU), a field-programmable gate array (FPGA) to retrieve and execute instructions, other electronic circuitry suitable for the retrieval and execution of instructions stored on a machine-readable storage medium, or a combination thereof. Processing resource 910 may fetch, decode, and execute instructions stored on storage medium 920 to perform the functionalities described below. In other examples, the functionalities of any of the instructions of storage medium 920 may be implemented in the form of electronic circuitry, in the form of executable instructions encoded on a machine-readable storage medium, or a combination thereof.

As used herein, a "machine-readable storage medium" may be any electronic, magnetic, optical, or other physical storage apparatus to contain or store information such as executable instructions, data, and the like. For example, any machine-readable storage medium described herein may be any of Random Access Memory (RAM), volatile memory, non-volatile memory, flash memory, a storage drive (e.g., a hard drive), a solid state drive, any type of storage disc (e.g., a compact disc, a DVD, etc.), and the like, or a combination thereof. Further, any machine-readable storage medium described herein may be non-transitory.

In the example of FIG. 9, instructions 922 may actively acquire (e.g., retrieve, etc.) or passively acquire (e.g., receive, etc.) in computing device 150 an image 905 ("captured image 905") of mat 200 captured by camera 164b.

In instructions 924, the computing device 150 may process the captured image 905 according to a mat characteristic of mat 200. The mat characteristic of mat 200 may be any of the characteristics described above with respect to FIG. 8.

In instructions 926, computing device 150 may display the processed image on display 152 of system 100. In other examples, the computing device 150 may project the processed image onto surface 202 of mat 200.

In some examples, instructions 922, 924, and 926 may be part of an installation package that, when installed, may be executed by processing resource 910 to implement the functionalities described herein in relation to instructions 922, 924, and 926. In such examples, storage medium 920 may be a portable medium, such as a CD, DVD, flash drive, or a memory maintained by a computing device from which the installation package can be downloaded and installed. In other examples, instructions 922, 924, and 926 may be part of an application, applications, or component already installed on computing device 150 including processing resource 910. In such examples, the storage medium 920 may include memory such as a hard drive, solid state drive, or the like. In some examples, functionalities described herein in relation to FIG. 9 may be provided in combination with functionalities described herein in relation to any of FIGS. 1-8.

Figure 10:
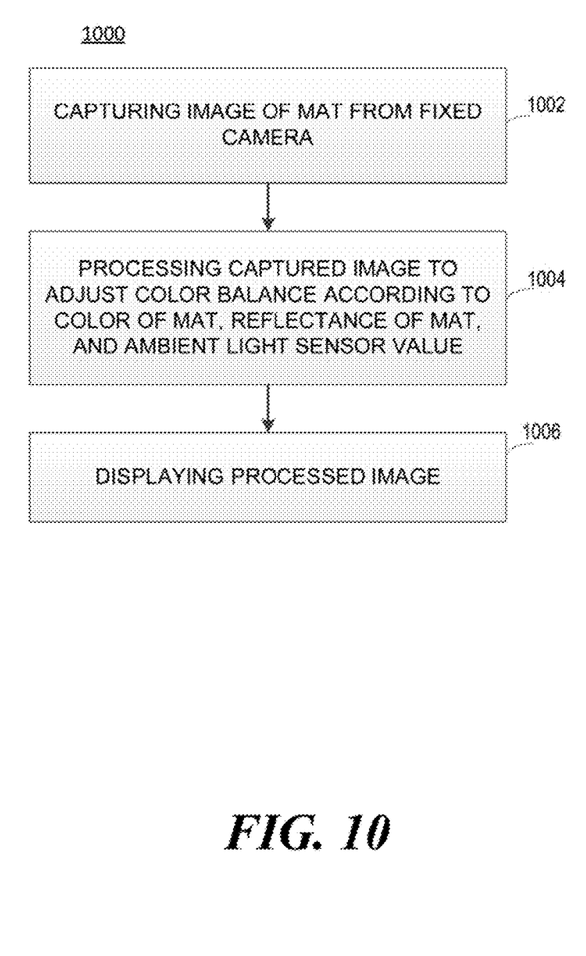
FIG. 10 is a flowchart of an example method for image processing.

FIG. 10 is a flowchart of an example method 1000 for image processing. Although execution of method 1000 is described below with reference to computing device 150 and system 100 described above, other suitable systems for the execution of method 1000 can be utilized. Additionally, implementation of method 1000 is not limited to such examples.

At 1002 of method 1000, camera 164b of system 100 may capture an image of mat 200 from its fixed position in the system 100. In the example of FIG. 10, the color of mat 200 and the reflectance of mat 200 may be set in computing device 150, for example, according to a hex value, etc.

At 1004, computing device 150 may process the captured image according to the color of mat 200, the reflectance of mat 200 and a sensor value from ambient light sensor 164a.

At 1006, computing device 150 may display the processed image on display 152. In an example, the processed image may be projected onto surface 202 by projector assembly 184 via top 160.

Although the flowchart of FIG. 10 shows a specific order of performance of certain functionalities, method 1000 is not limited to that order. For example, the functionalities shown in succession in the flowchart may be performed in a different order, may be executed concurrently or with partial concurrence, or a combination thereof. In some examples, functionalities described herein in relation to FIG. 10 may be provided in combination with functionalities described herein in relation to any of FIGS. 1-9.

While device 150 has been described as an all-in-one computer, it should be appreciated that in other examples, device 150 may further employ the use of more traditional user input devices such as, for example, a keyboard and a mouse. In addition, while sensors 164a, 164b, 164c, 164d within bundle 164 have been described as each representing a single sensor or camera, it should be appreciated that each of the sensors 164a, 164b, 164c, and 164d may each include multiple sensors or cameras while still complying with the principles described herein. Further, while top 160 has been described herein as a cantilevered top, it should be appreciated that in other examples, top 160 may be supported at more than one point and is thus may not be cantilevered while still complying with the principles disclosed herein.

What is claimed is:

1. A system comprising:
   a support structure including a base, an upright member extending upward from the base, and a cantilevered top extending outward from the upright member;
   a camera disposed in the cantilevered top;
   an all-in-one computer attachable to the support structure and communicatively coupled to the camera; and
   a mat communicatively coupled to the all-in-one computer including a mat characteristic,
   wherein the all-in-one computer is to cause the camera to scan the mat to produce a scanned image and the all-in-one computer is to process the scanned image according to the mat characteristic in order to adjust the scanned image.

2. The system of claim 1, wherein the mat characteristic is at least one of the color of the mat, a reflectance of the mat, a location of the mat in a field of view of the camera, and an angle between the camera and the mat.

3. The system of claim 2, wherein the all-in-one computer is to process the scanned image to adjust at least one of a color balance, an image illumination, a lens distortion, and a geometric correction of the scanned image according to the mat characteristic.

4. The system of claim 3, further comprising:
   a sensor disposed in the cantilevered top and communicatively coupled to the all-in-one computer,
   wherein the all-in-one computer is to process the scanned image according to the mat characteristic and a sensor value of the sensor.

5. The system of claim 4, wherein the sensor is at least one of an ambient light sensor, an infrared camera sensor, a depth sensor, a three dimensional user interface sensor, and a time of flight depth sensor.

6. The system of claim 1, wherein the mat is a touch-sensitive mat to determine a location of an object on the mat and the all-in-one computing device is further to process the scanned image according to the location of the object on the mat.

7. The system of claim 5, wherein the all-in-one computer is to process the scanned image to adjust color balance according to the color of the mat and the reflectance of the mat.

8. The system of claim 3, wherein the all-in-one computer is to process the scanned image to reduce lens distortion in the scanned image according to the location of the mat in the field of view of the camera.

9. The system of claim 5, wherein the all-in-one computer is to process the scanned image to adjust geometric correction according to the location of the mat in the field of view of the camera and an ambient light value from the ambient light sensor.

10. A non-transitory machine-readable storage medium comprising instructions executable by a processing resource to:
    acquire an image of a mat from a camera in a computing device;
    process the image according to a mat characteristic of the mat and a sensor value of a sensor in the computing device in order to adjust the image; and
    display the processed image on a display of the computing device,
    wherein the mat characteristic is one of distance between the mat and the camera, an angle between the mat and camera, a color of the mat, and a reflectance of the mat.

11. The storage medium of claim 10, wherein the sensor is at least one of an ambient light sensor, an infrared camera sensor, a depth sensor, a three dimensional user interface sensor, and a time of flight depth sensor.

12. The storage medium of claim 10, wherein the mat is a touch sensitive mat to determine a location of an object on the mat and the instructions to process the image further comprises to process the image according to the location of the object on the mat.

13. A method comprising:
    capturing an image of a mat from a fixed camera;
    processing the captured image to adjust color balance according to a color of the mat, a reflectance of the mat, and an ambient light sensor value; and
    displaying the processed image.

14. The method of claim 13, wherein the captured image is further processed to adjust at an image illumination and a lens distortion according to the distance between the mat and the camera.

15. The method of claim 13, wherein the mat is a touch sensitive mat to determine a location of an object on the mat and the captured image is further processed according to the location of the object on the mat.

* * * * *